Sept. 5, 1950   E. L. HUNT ET AL   2,521,293
WHEELED GRASS SHEARS
Filed March 14, 1946
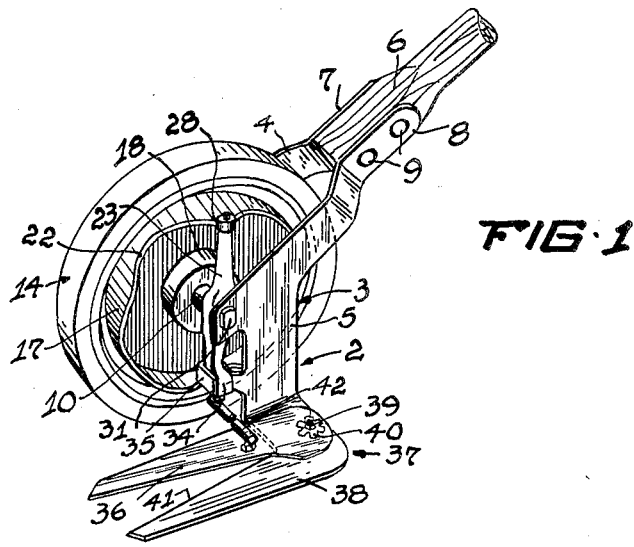
FIG. 1
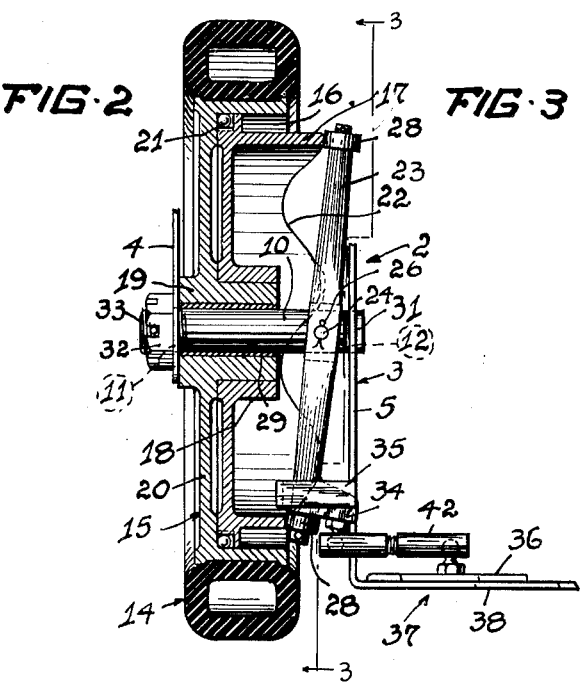
FIG. 2   FIG. 3
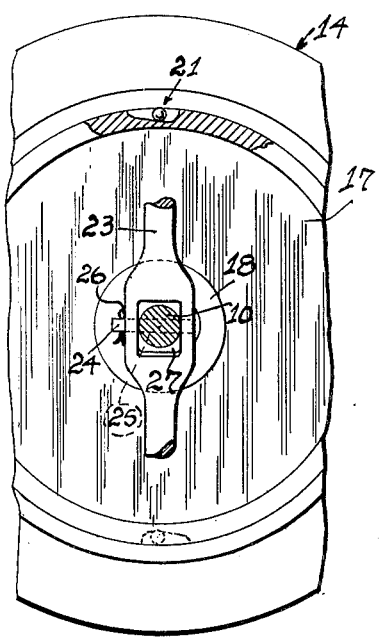
INVENTORS.
EDWIN L. HUNT
BY OSCAR A. NEUMAN
Gustav A. Wolff. ATT Patented Sept. 5, 1950

2,521,293

UNITED STATES PATENT OFFICE 2,521,293

WHEELED GRASS SHEARS

Edwin L. Hunt, Lakewood, and Oscar A. Neuman, Cleveland, Ohio

Application March 14, 1946, Serial No. 654,445

2 Claims. (Cl. 56—248)

This invention relates in general to portable shears for cutting grass and the like, and, more particularly, to shears adapted to trim lawn edges, narrow areas and places inaccessible to ordinary lawn mowers.

The general object of the invention is the provision of simple, compact portable shears constructed with simple operating mechanism positively coupled with cutting means for positive actuation of such cutting means.

Another object of the invention is the provision of portable shears having shear-like cutting means actuated by simple operating mechanism positively coupled with the cutting means by ball joint link means arranged above the cutting means to effect reciprocatory cutting and tilting action of the cutting means and proper cutting and self-cleaning of the cutting means when the shears are operated.

A further object of the invention is the provision of portable shears with cutting blade means actuated by equilateral lever means in cooperation with cylindrical cam means, with the lever means and cam means associated to effect positive oscillatory movement of the lever means and positive cutting operation of the cutting blade means.

Still another object of the invention is the provision of portable shears in which a frame structure rotatably supports a supporting and driving wheel on a shaft mounted in said frame structure, in which cam mechanism is mounted on the wheel and cooperating equilateral lever means are pivotally supported by such shaft, and in which shear blade means having a stationary blade and a movable blade are directly coupled with the lever means in a plane above the blades of said shear blade means to effect reciprocatory cutting and tilting movements of the movable blade and therewith proper cutting and self-cleaning action of the shears in use.

Still further objects and novel features of construction, combination and relations of parts by which the objects in view have been attained, will appear and are set forth in detail in the course of the following specification.

The drawing accompanying and forming part of the specification illustrates a certain practical embodiment of the invention, but it will be apparent as the specification proceeds that the structure may be modified and changed in various ways without departure from the true spirit and broad scope of the invention.

In the drawing:

Fig. 1 is a perspective view of a portable shears embodying the invention.

Fig. 2 is an enlarged vertical sectional view through the portable shears shown in Fig. 1; and Fig. 3 is fragmentary sectional view partly in elevation on line 3—3 of Fig. 2.

Referring now in detail to the exemplified form of the invention shown in the drawing, reference numeral 2 denotes portable shears with a frame structure 3 constructed of two opposed sheet steel brackets 4 and 5 coupled with each other to the fork-shaped wheel supporting frame structure by operating handle 6 secured to the upper ends 7 and 8 of the brackets by bolts 9. Frame structure 3 non-rotatably supports a shaft 10 which extends through opposed openings 11 and 12 in said brackets and freely rotatably mounts a rubber tired driving wheel 14, the frame 15 of which is recessed at 16 and rotatably mounts in its recessed portion a cylindrical cam member 17, the hub portion 18 of which is freely rotatably supported on hub portion 19 of frame 15. The cylindrical cam member 17 carries adjacent to vertical wall 20 of frame 15 a one-way clutch 21 and is formed with a cam edge 22 shaped to oscillate an equilateral lever 23 pivoted to shaft 10 by a pin 24 which is extended through a bore 25 in said shaft and held in working position by a cotter pin 26. The equilateral lever 23 has arranged in its central portion an elongated opening 27 equal in width to the diameter of shaft 10 and carries on its end portions antifriction rollers 28 engaging and cooperating with cam edge 22 of cylindrical cam member 17.

Shaft 10 is shiftably mounted in bore 29 of hub portion 19 and is prevented from axial rotation by the elongated shape of opening 12 in bracket 5 through which flattened end 31 of shaft 10 extends, shaft 10, in addition, is prevented from axial shifting in bore 29 by a nut member 32 engaging the threaded end 33 of said shaft to effect shifting of said shaft for proper contact of rollers 28 with cam edge 22 and proper take-up of the operating mechanism in case of wear.

Equilateral lever 23 extends with its lower enlarged end portion 34 into a U-shaped extension 35 of bracket 5, and this enlarged end portion is coupled with a movable shear blade 36 of a cutting device 37, the stationary shear blade 38 of which is formed by laterally extending bracket 5 at its bottom edge. The movable shear blade 36 of cutting device 37 is pivoted to stationary shear blade 38 by a bolt 39 and is yieldingly forced into engagement with such stationary shear blade by a yielding spring washer 40 permitting slight reciprocatory tilting of movable shear blade 36 with respect to the stationary shear blade 38 when lever 23 effects pivoting of the movable shear blade toward and away from cutting edge 41 of stationary shear blade 38. Such a reciprocatory tilting action of movable shear blade 36 is effected by a coupling 42 connecting the end portion 34 of lever 23 with movable shear blade 36. The coupling 42 is positioned above the cutting device 37 to provide leverage for tilting movable shear blade 36 in opposite directions, and this coupling device consists of an axially adjustable link member connected by ball joints with the end portion 34 of lever 23 and the movable shear blade 36.

Having thus described our invention what we claim is:

1. In wheeled grass shears, a U-shaped frame including the stationary part of a cutter member, a shaft having its one end axially adjustably secured to said frame, and its other end axially shiftably, non-rotatably supported by said frame, a traction wheel rotatably mounted on said shaft, an equilateral lever pivotally supported by said shaft between its opposite ends, cam means associated with said wheel adapted to actuate said lever, a cutting blade pivotally mounted on the said stationary part of the cutter member and coupled with said lever, and a holding and adjusting screw member on said one end of said shaft for adjusting and securing the frame, traction wheel, equilateral lever and cam means in proper working relation with respect to each other.

2. Wheeled grass shears as described in claim 1, wherein the said other end of said shaft includes a flattened end portion extended through an elongated hole in said frame to axially shiftably and non-rotatably mount said other end of said shaft in said frame.

EDWIN L. HUNT.
OSCAR A. NEUMAN.

REFERENCES CITED

The following references are of record in the file of this patent:

UNITED STATES PATENTS

| Number | Name | Date |
|---|---|---|
| 715,838 | McCallum | Dec. 16, 1902 |
| 1,428,284 | Heimann | Sept. 5, 1922 |
| 1,774,594 | Dombeck | Sept. 2, 1930 |
| 2,378,488 | Loewe et al. | June 19, 1945 |